Feb. 24, 1953   H. L. PAUL, JR   2,629,579
BALL VALVE
Filed Feb. 24, 1947
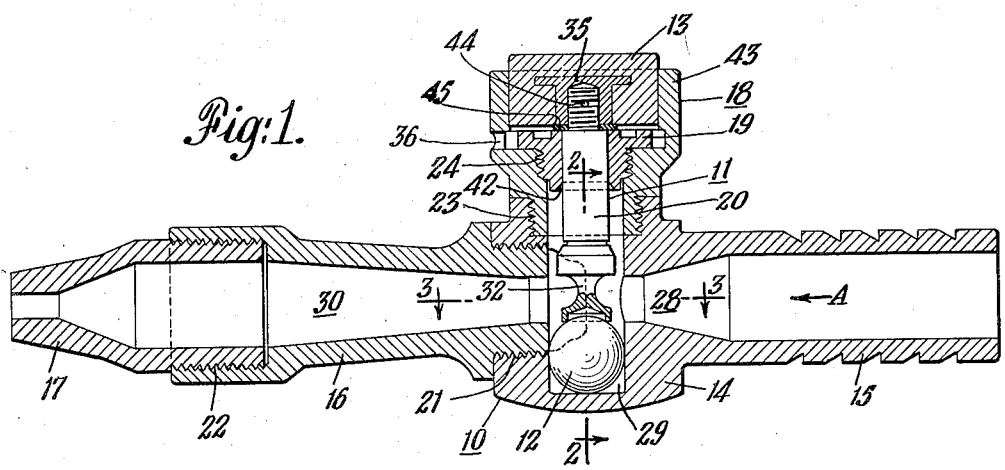
Fig:1.
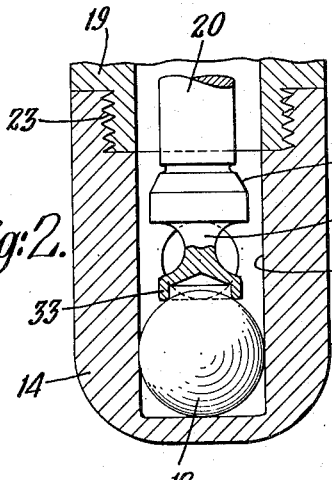
Fig:2.
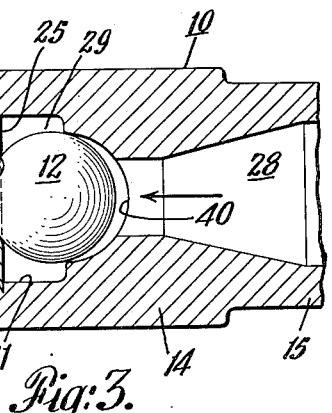
Fig:3.
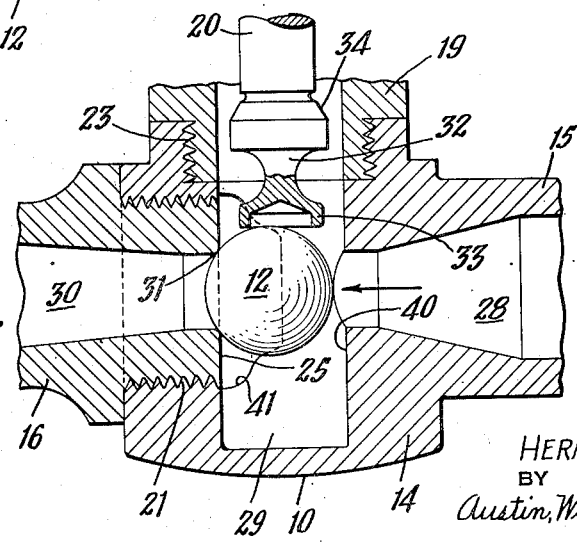
Fig:4.
INVENTOR
HERMAN L. PAUL JR.
BY
Austin, Wilhelm + Carlson
ATTORNEYS Patented Feb. 24, 1953

2,629,579

UNITED STATES PATENT OFFICE 2,629,579

BALL VALVE

Herman L. Paul, Jr., New Rochelle, N. Y., assignor to Paul Valve Corporation, Essex Fells, N. J., a corporation of New Jersey Application February 24, 1947, Serial No. 730,318

6 Claims. (Cl. 251—135)

The invention relates to valves for controlling the flow of fluids and, more particularly, to a simple, easily controlled valve.

The present application constitutes a continuation-in-part of application, Serial No. 604,245, filed July 10, 1945, and of applications, Serial Nos. 661,151 and 661,152, both filed April 10, 1946; all of which prior applications are now abandoned.

Among the objects of the present invention are to provide a valve of the above nature which is simple in construction, easy to operate, which has long life and which immediately opens or closes by pressing or releasing a pushbutton.

An important feature of the invention is the utilization of Bernoulli's theorem to attain the above objects. According to this theorum, a member on the edge of a fluid stream is drawn from the periphery of the stream inwardly toward the middle of the stream by the faster flow and lower pressure there.

According to a preferred form of the invention, the valve comprises a straight-through passage having converging and diverging walls forming a venturi. A recess intersects the straight-through passage at the throat of the venturi, forming a seat against which a ball is lodged to close the valve. A pushbutton actuator pushes the ball out of the path of fluid flow to open the valve and is drawn into the fluid flow into seating position by the hydrodynamic lift due to the Bernoulli effect. The actuator comprises a spool-like member having an annular flange adapted to contact the ball, when seated, in such way as to remove the ball from its seat easily and quickly. Suitable sealing seats may be provided for the pushbutton actuator to seal the actuator against leakage both in open and in closed positions.

The invention also consists in certain new and original features and combinations hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part hereof, in which Fig. 1 is a longitudinal vertical section taken through the valve, illustrating it in full open position;

Fig. 2 is an enlarged transverse vertical section, taken on line 2—2 of Fig. 1;

Fig. 3 is an enlarged plan section, taken on the line 3—3 of Fig. 1;

Fig. 4 is an enlarged longitudinal vertical fragmentary section, illustrating the valve in full closed position.

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Referring now to the drawings, the valve comprises, in general, a casing 10, an actuator 11, a ball 12 and a pushbutton 13. Depressing the pushbutton 13 holds the ball in full open position, as shown in Fig. 1. Releasing the pushbutton causes the ball to seat, closing the valve, as shown in Fig. 4. This construction and operation is described more in detail below.

The casing 10 comprises a main body 14 having a tube 15 for connection to flexible hose or the like, as will be understood by those skilled in the art. A forward tube 16 has threaded engagement 21 with body 14. A nozzle tip 17 has threaded engagement 22 with forward tube 16. A bonnet 18 has threaded engagement 23 with body 14 and a cap 19 has threaded engagement 24 with bonnet 18.

The body 14 has a converging circular passage 28, assuming the flow to be in the direction of the arrow A. The converging passage 28 runs into a short straight passage which intersects with transverse recess 29. Recess 29 intersects with a short straight passage in forward tube 16 which runs into a circular flaring passage 30. The nozzle tip 17 has a converging passage connecting with a straight end passage, as will be understood by those skilled in the art.

The tapered passages 28 and 30 form in effect a venturi whose throat is intersected by the recess 29. The recess has a plane wall 25 intersecting the straight end of passage 30 to form a circular seat 31 for ball 12. The seat 31 may be slightly conical or rounded.

The recess 29 is conveniently formed by drilling a hole 40 in body 14 of a diameter slightly larger than the ball and then drilling, at right angles to hole 40, a hole 41, the outer end of which hole has the screw threads 21. Thus it is convenient to form the plane surface 25 on the end of forward tube 16 for the seat 31.

The actuator 11 comprises a spool-like member 32 having an end recess forming an annular flange 33 to engage ball 12. The stem 20 of actuator 11 has a shoulder 34 seatable against a seat 42 on cap 19 to prevent leakage along stem 20 with the valve in closed position.

The outer end of bonnet 18 is made in the form of a sleeve 43 slidably receiving the molded pushbutton 13 in which is molded the insert 35. Stem 20 is threaded into insert 35 and a pin 44 prevents loosening of insert 35 on stem 20.

A relief vent 36 communicates with an annular space at the bottom of sleeve 43 to prevent trapping of air when pushbutton 13 is moved inwardly. A sealing washer 45 is interposed between insert 35 and shoulder on stem 20. Washer 45 engages cap 19, with the valve in open position, to seal the passage for stem 20 against leakage.

The valve makes use of the Bernoulli theorem, according to which a member is always drawn from the edge of a flowing stream toward its middle by the faster flow and lower pressure there. The ball, being placed on the edge of the stream flow, tends to move to the center of the stream flow.

In explaining operation, the valve will first be assumed to be in full open position as illustrated in Fig. 1 where it is held by engagement of the operator's finger on the pushbutton. The flow through the valve, in the direction of the arrow A, passes substantially unimpeded except for the slight impedance offered by the spool 32. The ball 12 is entirely out of the stream flow, its lower side resting on the flat bottom of the recess 29 and its upper side being on the edge of the vena contracta of the stream.

The Bernoulli effect acts to move the ball 12 toward closed position and the pressure of the fluid passing through the valve acting upon the area of the stem 20 also acts to move the valve to closed position, but the parts are so proportioned that these forces are comparatively small; hence the valve can be held open against these restoring forces by relatively small finger pressure. Any fluid tending to leak out between stem 20 and cap 19 is stopped by washer 45.

To close the valve, it is only necessary to remove the finger from the pushbutton 13. The pressure on the stem 20 and the Bernoulli effect on the ball act to raise the stem and the ball so that the ball 12 seats immediately on seat 31. The fluid pressure on the stem further raises it so that the spool clears the ball slightly, as indicated in Fig. 4. Sealing against leakage with the valve in full closed position is obtained by engagement of the angle shoulder 34 against angle seat 42 on the cap 19.

To open the valve, it is only necessary to exert light finger pressure on the pushbutton 13. This causes the annular edge 33 of the spool cup to engage the ball 12 as soon as the cup moves downwardly a fraction of an inch from the position indicated in Fig. 4. It will be noted from Fig. 4 that the edge 33 is so shaped as to engage the ball 12 at a point between the plane of the seat face 25 and a parallel plane passing through the ball center. Vertical force exerted at this point is impressed upon the ball in such direction as to roll or lift the ball off its seat with minimum effort, without in any way damaging the seat. The fact that the contact edge on the actuator is of annular configuration removes any necessity for using a key or other means to prevent rotation of the actuator.

The relationship between ball diameter and seat diameter is such as to permit the ball to fit sufficiently far within the seat to give good sealing action but the ball 12 should not project into the seat 31 so far as to require uncomfortably high finger pressure to open the valve. It will be understood that the valve may be used in any position—vertical, as shown, inverted, or its side, etc.—without changing the action of the Bernoulli effect.

The valve will stand up under rough usage such as that to which hose valves are commonly subjected, as when used on the end of a hose where they are often dropped and pulled along the ground or floor. The finger pressure on the pushbutton gives instant flow and removing pressure from the pushbutton instantly closes the valve tight.

It will be noted that the valve is opened and closed without the use of any springs, thus eliminating the additional force which a spring interposes and also chattering and breakage which are common features of springs. The opening pressure is derived from the finger of the operator and the closing pressure entirely from the Bernoulli effect on the ball and pressure effect on the stem.

The use of the Bernoulli effect results in a valve of utmost simplicity of moving parts. In addition, cost of manufacture is reduced by forming part of the body recess by drilling the holes at right angles to each other, as explained above.

The angle of taper of the converging and diverging conduits 28, 30 forming the venturi may vary. In fact either taper, or both, may be eliminated entirely. In any event, it is important to make the spacing between the plane surface 25 of the seat 31 and the opposite throat, formed by passage 28 intersecting recess 29, substantially equal to the ball diameter.

The hydrodynamic action according to the Bernoulli principle is obtainable over a wide range of fluid velocities and the Venturi principle, by increasing the throat velocity over and above velocity in the pipe, makes the Bernoulli lift effective over a greater range of pipe velocities.

Since the Bernoulli effect will lift comparatively heavy metal balls, it will also lift any foreign matter which might settle out in the bottom of the valve when the valve is closed, thus making the valve self-flushing. This effect also prevents settling of foreign matter in the valve when fluid is flowing.

The Venturi shaped body reduces the physical dimensions of the valve for handling any given flow rate and also enhances the Bernoulli effect which requires the presence of a certain minimum velocity of flow. The spool actuator, extending across the throat of the venturi when the valve is open, interposes minimum resistance to fluid flow and yet can be manufactured very inexpensively.

The vital parts for sealing flow constitutes the ball and the circular seat, both of which may be precision ground, thus insuring positive stoppage of flow. Resting of a ball on a conical or convex seat provides ideal contact. The fact that the ball never seats in the same position on the seat insures long life to the ball.

The valve is self-closing. When the valve is shut, all of the operating parts are relieved of external stress. The ball is held in its seat and the actuator is held with its shoulder against its seat both by fluid pressure. The valve will handle a wide variety of liquids and gases.

While certain novel features of the invention have been disclosed herein, and are pointed out in the annexed claims, it will be understood that various omissions, substitutions and changes may be made by those skilled in the art without departing from the spirit of the invention.

What is claimed is:

1. In a valve, a casing comprising a body member having a first cylindrical bore hole and a second cylindrical bore hole intersecting said first bore hole, a seat member closing said second bore hole and having a plane end surface with a seat, a bonnet closing said first bore hole, said bonnet having a sleeve, a cap in said bonnet, said cap having an opening, said seat and body members having a substantially straight passage intersecting the recess formed by said bore holes, a ball in said recess, a spool-shaped actuator having an annular flange engageable with said ball, when the ball is seated on said seat, at a point on the ball between the plane of the seat and a parallel plane through the ball center, said actuator having a stem slidable in said cap opening, a pushbutton slidable in said sleeve and connected to said stem, said stem having annular abutments on opposite sides of said cap whereby to seal said stem against leakage in both the innermost and outermost positions of the actuator.

2. In a valve, a casing having a substantially straight flow passage extending therethrough and a recess intersecting said flow passage, said recess forming aligned, opposed orifices, at least one of which constitutes a circular seat, the stream flow path extending directly across said recess between said aligned orifices, a ball in said recess seatable on said seat, the distance between said orifices being substantially equal to the diameter of the ball, an actuator movable lengthwise of said recess and having a push stem slidable through said casing, said recess being sufficiently long to permit said ball to be moved from closed position on said seat, by pressing said push stem, to a full open position substantially out of the stream flow path between said orifices, said ball being movable from said last-mentioned position to closed position by the dynamic lift caused by the velocity of fluid flowing through said flow passage.

3. In a valve, a casing having a substantially straight flow passage extending therethrough and a recess intersecting said flow passage, said passage converging from both outer ends toward said recess to form a venturi, said recess forming opposed and aligned orifices at least one of which constitutes a circular seat, the fluid flow path extending directly across said recess between said aligned orifices, a ball in said recess seatable on said seat, the distance between said orifices being substantially equal to the diameter of the ball, an actuator movable lengthwise of said recess for removing the ball from its seat, a slidable push stem projecting through said casing and connected to said actuator, said recess being of sufficient length to allow said ball to be moved from closed position on said seat, by pressing said push stem, to open position substantially out of the flow path between said orifices, said ball being returnable from open to closed position by the dynamic lift on said ball due to velocity of fluid flow through the valve.

4. In a valve, a casing having a flow passage extending therethrough and a recess intersecting the flow passage, said recess having opposed orifices, one of which is a circular seat, a ball in said recess seatable on said seat, said recess being of sufficient length to allow said ball to move to full open position substantially out of the flow space between said orifices, a push stem slidably mounted in said casing and having a spool-shaped actuator with an annular flange, said annular flange being engageable with said ball, when the ball is seated on said seat, at a point between the plane of the seat and a parallel plane through the ball center, said actuator having an enlarged portion connected to said stem and a reduced core connecting said annular flange and enlarged portion, said reduced core being disposed in said flow space when the ball is in full open position, the construction being such that the velocity of fluid flow through the valve provides a dynamic restoring force on said ball, when the ball is displaced from said seat to full open position by said push stem.

5. In a valve, a casing having a Venturi-shaped flow passage extending therethrough and a recess intersecting the flow passage at the throat of the venturi, said recess forming opposed and aligned throat orifices, one of which is a circular seat, a ball in said recess seatable on said seat, said recess being of sufficient length to permit said ball to be moved to a position substantially clear of the flow space between said throat orifices, a push stem slidably mounted in said casing, a spool-shaped actuator attached to said stem, said actuator having an annular flange engageable with said ball, when the ball is seated on its seat, at a point between the plane of the seat and a parallel plane through the ball center, the construction being such that the velocity of fluid flow through the valve provides a dynamic restoring force on said ball, when the ball is displaced from said seat by said actuator.

6. A valve comprising a chamber, a ball therein, said chamber having an inlet, said chamber having an outlet providing a seat for said ball, a freely rotatable push stem slidably mounted in the wall of said casing on the same side of the outlet seat as the ball, said push stem having an annular cup-shaped flange concentric with the axis of said stem, said flange being engageable with said ball, when the ball is seated on said seat, at a point located between the plane of said seat and a parallel plane through the ball center, whereby to facilitate displacing said ball from said seat, against the fluid pressure holding it there, by pressing said push stem.

HERMAN L. PAUL, Jr.

REFERENCES CITED

The following references are of record in the file of this patent:

UNITED STATES PATENTS

| Number | Name | Date |
|---|---|---|
| 658,797 | Moeres | Oct. 2, 1900 |
| 659,644 | Bradley | Oct. 16, 1900 |
| 690,011 | Blake | Dec. 13, 1901 |
| 971,295 | Menear | Sept. 27, 1910 |
| 980,260 | Hodgkinson | Jan. 3, 1911 |
| 1,334,870 | Lowery | Mar. 23, 1920 |
| 1,484,643 | Hansen | Feb. 26, 1924 |
| 1,588,562 | Vives | June 15, 1926 |

FOREIGN PATENTS

| Number | Country | Date |
|---|---|---|
| 59,505 | Austria | of 1913 |
| 527,345 | Great Britain | of 1940 |
| 551,386 | Great Britain | of 1943 |